(No Model.)
A. F. L. BELL.
EXPLOITATION AND CONVEYANCE OF BITUMINOUS MATERIAL.
No. 596,468. Patented Jan. 4, 1898.
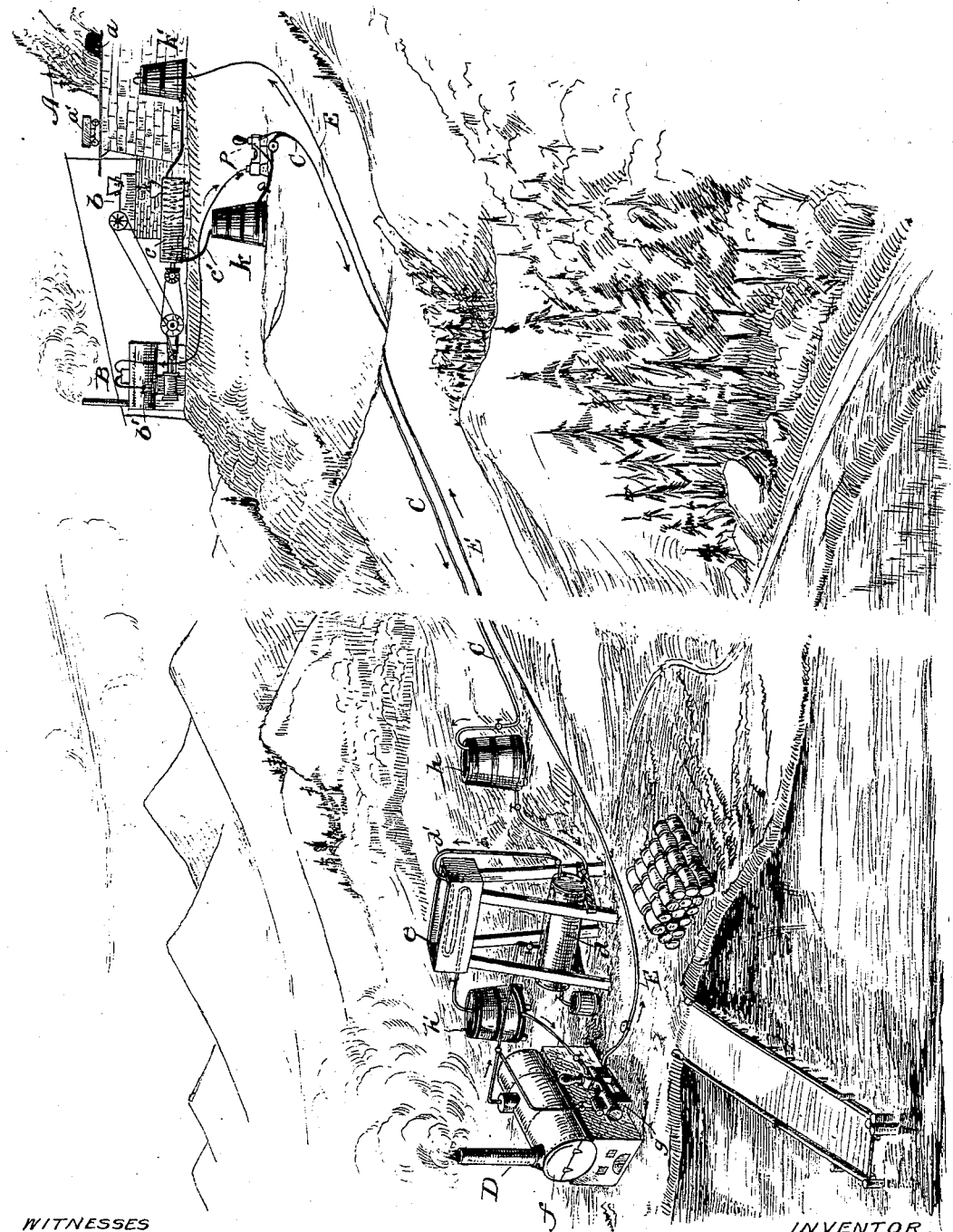
WITNESSES
J. M. Fowler Jr.
H. H. Bates
INVENTOR,
Arthur F. L. Bell,
By J. Richards
ATTORNEY

UNITED STATES PATENT OFFICE.

ARTHUR F. L. BELL, OF CARPINTERIA, CALIFORNIA.

EXPLOITATION AND CONVEYANCE OF BITUMINOUS MATERIAL.

SPECIFICATION forming part of Letters Patent No. 596,468, dated January 4, 1898.

Application filed May 5, 1897. Serial No. 635,251. (No model.)

*To all whom it may concern:*

Be it known that I, ARTHUR F. L. BELL, a citizen of the United States, residing at Carpinteria, in the county of Santa Barbara and State of California, have invented certain new and useful Improvements in the Exploitation and Conveyance of Bituminous Material; and I do hereby declare the following to be a full, clear, and exact description of the invention, such as will enable others skilled in the art to which it appertains to make and use the same.

My invention relates to the exploitation and treatment of crude bituminous materials and kindred substances as they exist in the natural state in places difficult of access and without facilities for transportation by ordinary means with reference to and in connection with means for the economical conveyance of said material or the valuable product derived therefrom to a point available for commerce and means for recovering and transporting the chemical agencies by which said treatment is conducted back to the original point.

The invention has specific reference to the treatment and utilization of immense natural deposits occurring in the United States, particularly on the west coast, where the bituminous matter exists infiltrated more or less richly into and between strata of silicious and earthy materials elevated in some cases by the processes of nature nearly two thousand feet above the ocean-level, with broken and impassable country between it and the sea some twenty or thirty miles, and much of which material contains too great a proportion of earthy and unutilizable ingredients to be profitably mined and transported by usual transportation agencies.

In the drawing forming a part of this specification, A represents the natural cliff or outcrop of saturated sandy and earthy deposit at a considerable altitude above the sea-level, from which excavations are being made of the crude natural deposit for treatment.

B represents the plant of mechanical and chemical appliances for the treatment and solution of the said crude material to bring it to the transportable condition hereinafter described.

C represents a pipe-line traversing the country between the said deposit and the shipping-point suitable for conveying the dissolved and fluent material to the point of final treatment.

D represents a plant for the recovery by distillation of the solvent and pumping or other hydraulic agencies connected therewith, and E represents a pipe-line extending from the said plant D to the original place of deposit, through which the recovered solvent is passed by hydraulic appliances to the said original point.

Coming to details, $a$ is a trackway extending from the place of excavation in the deposit to the plant B, on which trackway the crude product is transported in vehicles represented by the car $a'$.

$b$ represents a breaker or crusher of well-known construction suitable for the purpose, into which the said product is dumped.

$c$ is a diagrammatic representation of the stirrer, mixer, dissolver, and segregator, of suitable construction, not necessary to describe in this application, in which the material after reduction in the crusher is treated for solution and in most cases for the elimination of some or all of the earthy ingredients, which add greatly to the bulk without contributing to its value as a commercial product.

$b'$ is a diagrammatic representation of a steam engine and boiler plant which furnishes the power required to run the crusher, the mixer, and other power-driven appliances and, incidentally, the heat which may be required in the process of solution. This plant may be of any well-known construction suitable for the purpose, the details of which are foreign to the objects of this application.

$k$ and $k'$ represent storage-tanks, the uses of which will be presently mentioned. A pipe connection leads from the mixer and dissolver to the main pipe-line C, usually through an intermediate storage-tank $k$, which forms a reservoir for the temporary reception of the liquefied material. A storage-tank $k'$ is also provided, with which the pipe-line E is usually connected, and suitable pipe connections with cocks and valves lead from the said tank to the mixer and dissolver $c$. Suitable means are provided for removing from the mixer and dissolver any earthy material segregated from the bituminous mass which is not intended for transportation. A pump or similar hydraulic appliance is usually located in or connected with the main pipe-line C, (represented by $p$,) the use of which is to facilitate the flow of the dissolved material through the main pipe-line C when artificial aid is required, said pump being supplied with power from the steam-boiler plant by suitable pipe connections.

At the plant D, $d$ represents a steam-jacketed receiver or retort whose interior is in communication with the main pipe-line C, $h$ being an intermediate storage tank or reservoir into which the said main pipe-line C usually discharges, connected by suitable pipe connections, cocks, and valves with the said retort $d$.

$e$ represents an elevated condenser containing the usual coils and cooling appliances, where the volatilized solvent is conveyed by means of the pipe $d'$, which connects it with the retort $d$.

$h'$ represents a storage tank or reservoir connected by suitable pipe connections, cocks, and valves with the said condenser.

$f$ rudely represents a steam-boiler plant for supplying steam for the steam-jacket of the retort $d$ by suitable pipe connections and power for running the hydraulic apparatus.

$g$ represents a steam-pump or other suitable hydraulic appliance for forcing the solvent through the pipe-line E back to the starting-point. This pump communicates by suitable pipe connections, cocks, and valves with the steam-boiler for its supply of power and also with storage-tank $h'$, whence it draws its supply of recovered solvent for forcing into the pipe-line E. The said pump or hydraulic appliance is also in communication with the pipe-line by suitable connections. A barrel is shown suitably placed for receiving the purified bituminous product from the retort $d$ in preparation for shipment, and a pile of such barrels ready for shipment at the wharf is shown in the foreground.

The mode of operation is as follows: Excavation is conducted in the usual manner by suitable labor and mechanical appliances and explosive agencies at the original place of deposit, where the material is taken out in lumps or masses and transported by the tramway $a$ and cars $a'$ to the breakers. Here the material is dumped into the hopper of the apparatus and by mechanical power is reduced to small fragments suitable for treatment in the dissolver, into which the broken mass is passed in a continuous stream. In the dissolver the mass is thoroughly agitated by suitable mechanical means at such temperature as may be necessary while subjected to the action of some customary solvent, such as the distillates of petroleum, bisulfid of carbon, &c. The solvent is usually passed into the apparatus so as to meet the advancing product to be treated while being agitated and passed through the apparatus, so as to thoroughly saturate every particle of the same and gradually take it up in solution, of course leaving behind the waste and insoluble portion, more or less of which is taken out separately by a suitable provision, according to the degree of purity desired, while exit-pipes are provided at another point for drawing off the dissolved and fluent product and passing it into the storage-tank between it and the main pipe-line C for transportation. The said product then flows along through the said pipe-line, either by its own gravity or aided by artificial means, until it arrives at the plant D. Here it passes usually into a storage-tank $h$, and thence, as needed, into the steam-jacketed retort $d$, where heat is applied, by means of the steam-jacket, sufficient to volatilize the solvent and release it from its union with the bituminous or asphaltic material, which it is the object to recover. The said vaporized solvent passes by the pipe $d'$ into the worm or coil of the condenser $e$, where it becomes liquefied and passes provisionally into a suitable storage-tank $h'$, and thence, as needed, to the hydraulic apparatus $g$, whence it is forced by suitable power applied thereto into the main return-pipe line E, flowing therein under the pressure aforesaid back to the original starting-point at the place of deposit.

The advantages of this system are manifold. All asphalts, however rich in bituminous ingredients, belong to that class of freight material where a large quantity represents but a comparatively small value. This makes the expense of carriage amount to a comparatively large percentage of the actual value of the product, necessitating the utmost economy in transportation and handling to enable any given asphalt to compete in the markets of the world with those from other asphaltic deposits more favorably situated or richer. By dissolving at the mine the bulk to be transported is reduced to a minimum and at the same time rendered available for the comparatively inexpensive mode of transportation by pipe-line, while the recovered solvent at the terminal plant is inexpensively returned to the original point by means of the auxiliary pipe-line E and power appliances located at a point where fuel can be had at a practicable cost.

I am aware that pipe-lines for the conveyance of various natural and artificial products to great distances with economy are old and common, and I do not claim such to be of my invention. Plants and appliances for the treatment of various substances by solution and their recovery in purer form by dissolution or separation of the solvent are also broadly old and well known; but

What I claim as my invention, and desire to secure by Letters Patent, is—

1. In a system of apparatus for the exploitation and conveyance of bituminous and kindred substances found in the natural state, the following elements in combination: first, a plant for the treatment of the crude natural product by solvents; second, a pipe-line for the conveyance of the dissolved and segregated product to a distant point; third, a plant for the recovery of the solvent by distillation; fourth, a pipe-line for the reconveyance of the recovered solvent to the original point; and, fifth, suitable hydraulic means for causing the movement of the said fluids through the said pipe-lines; substantially as specified.

2. In a system of apparatus for the exploitation and conveyance of bituminous and kindred natural products, the combination of the following elements, viz: a mixing and dissolving apparatus, power appliances for operating the said apparatus, storage-tanks $k$ and $k'$, pipe-line C, distilling apparatus, storage-tanks $h$ and $h'$, hydraulic apparatus, power and heat generating appliances for operating the said hydraulic and distilling apparatus, and pipe-line E, all substantially as and for the purpose specified.

In testimony whereof I affix my signature in presence of two witnesses.

ARTHUR F. L. BELL.

Witnesses:
J. L. HURLBUT,
R. B. CANFIELD.